United States Patent [19]

Blanvillain et al.

[11] Patent Number: 5,087,797
[45] Date of Patent: Feb. 11, 1992

[54] AIR-CUSHION PANTOGRAPH

[75] Inventors: Gérard Blanvillain, Veretz; Pascal Forte, Tours, both of France

[73] Assignee: Faiveley Transport, Saint-Ouen Cedex, France

[21] Appl. No.: 646,643

[22] PCT Filed: Jun. 13, 1990

[86] PCT No.: PCT/FR90/00418
 § 371 Date: Feb. 6, 1991
 § 102(e) Date: Feb. 6, 1991

[87] PCT Pub. No.: WO90/15730
 PCT Pub. Date: Dec. 27, 1990

[30] Foreign Application Priority Data

Jun. 14, 1989 [FR] France ............................... 89 07864

[51] Int. Cl.$^5$ ............................................... B60L 5/16
[52] U.S. Cl. ............................................ 191/66; 191/67
[58] Field of Search ................. 191/66, 67, 85, 86, 191/87, 90, 94

[56] References Cited

U.S. PATENT DOCUMENTS 3,586,141  6/1971  Hennessey et al. ............... 191/67 X

FOREIGN PATENT DOCUMENTS

| 0356835 | 3/1990 | European Pat. Off. | 191/85 |
| 1952495 | 4/1971 | Fed. Rep. of Germany | 191/66 |
| 2329638 | 12/1974 | Fed. Rep. of Germany | 191/60.3 |
| 2135830 | 12/1972 | France . | |
| 236508 | 11/1969 | U.S.S.R. | 191/66 |
| 1306755 | 4/1987 | U.S.S.R. | 191/67 |
| 1472302 | 4/1989 | U.S.S.R. | 191/66 |

Primary Examiner—David A. Bucci
Assistant Examiner—Scott L. Lowe
Attorney, Agent, or Firm—Young & Thompson

[57] ABSTRACT

Pneumatic device for applying the upper end of a pantograph, termed a horned slipper holder, against the overhead contact wire with an appropriate pressure, characterized in that the pneumatic cushion (4) has, inside the leaktight enclosure (28) which is formed by the two cover plates (21, 22) and the rubber bellows (23), a connecting rod (32) exerting on the movable cover plate (22) a translational displacement which is reproducible as a function of the air pressure prevailing in the enclosure (28). This translational movement is transformed, via the two arms (34) acting on two ropes (38) and on two cams (39), into a rotation of the shaft (7) of the lower arm (8) of the pantograph.

7 Claims, 3 Drawing Sheets

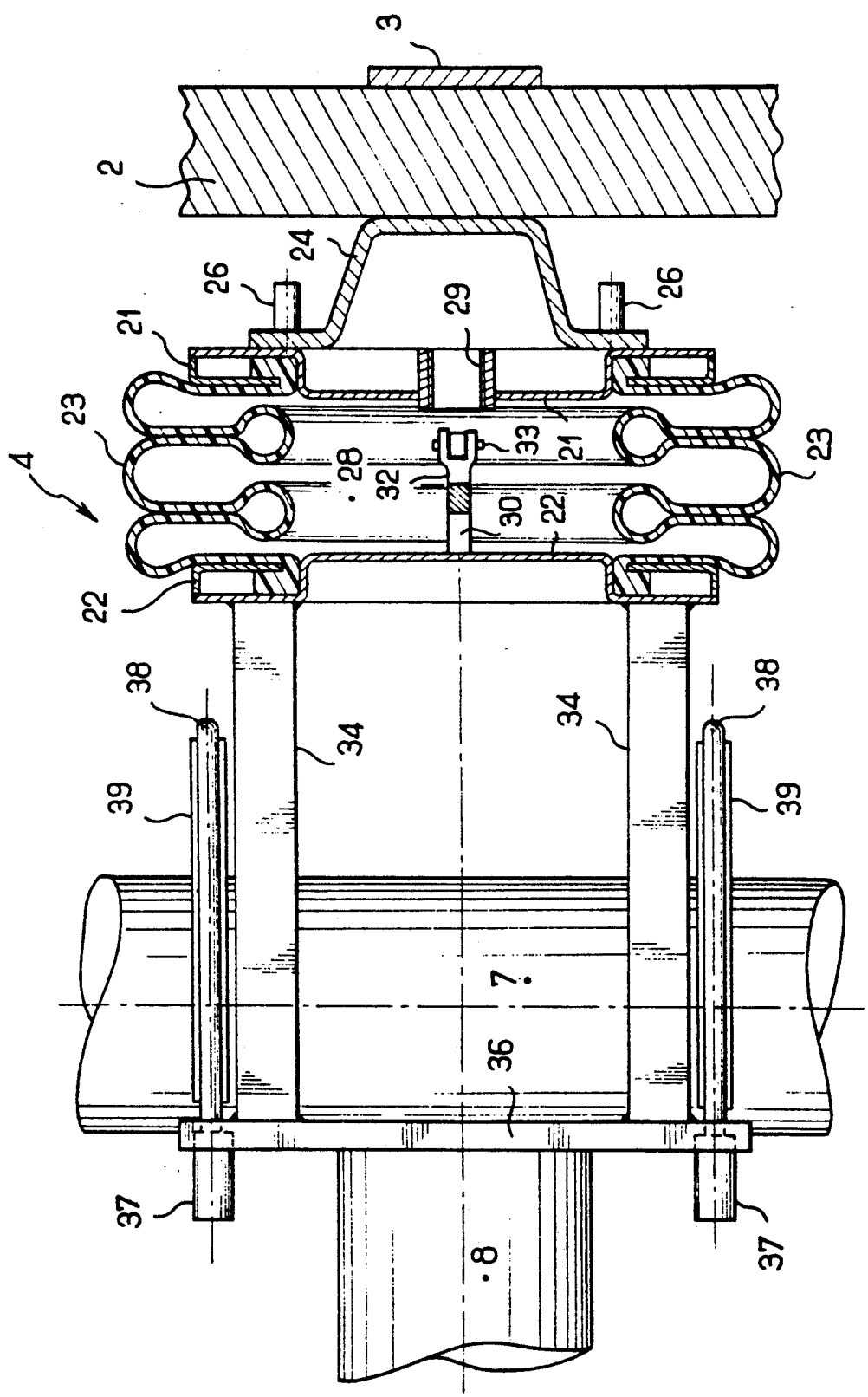
FIG_3

AIR-CUSHION PANTOGRAPH

BACKGROUND OF THE INVENTION

The present invention relates to a system, termed a pantograph, for supplying an electric-traction train with electric current by way of overhead conductors or overhead contact lines.

More precisely, the invention relates to systems enabling the electrical contact between the upper element of the pantograph, termed horned slipper holder, and the overhead contact line to be improved.

Indeed, it is important for the said electrical contact to be established permanently during periods of use and, moreover, it is desirable for this contact to provide as constant a resistance as possible to the passage of the electric current whatever the circumstances and, in particular, whatever the speed of the train.

With a view to obtaining a uniform electrical contact between the horned slipper holder and the overhead contact line, it is known to use systems whose function is to apply the horned slipper holder against the overhead contact, line with a certain elasticity caused, for example, by the presence of springs, the latter enabling certain environmental variations to be withstood without the contact being affected unduly by them.

In particular, it is known to use a device of the type called the air-cushion type, comprising a pneumatic member consisting of two parallel cover plates connected at their periphery by an element in the form of an elastic bellows, the first cover plate being integral with the structure of the driving car and the second cover plate being able to undergo a displacement of limited magnitude.

When the bellows is distended with a gas, such as compressed air at a given pressure, the folds of the bellows are expanded, which causes the movable cover plate to be displaced. This displacement is accompanied by a rotational movement of the axis of a lower arm of the pantograph, this rotational movement enabling a certain pressure to be exerted by the horned slipper holder against the overhead contact line.

When functioning, with the locomotive running on the track, the said device plays, to a certain extent, the role of a return spring with particular properties.

In order to ensure an approximately horizontal movement of the movable cover plate, it is generally made integral with the end of a substantially vertical rod, fastened at its lower end, in an articulated manner, to the structure of the driving car. The above rod is relatively long and capable, at its upper end, of a substantially horizontal range of movement, which enables it to serve as a guide for the movable cover plate when the latter is displaced by a limited amplitude. A rod must be used which is sufficiently long that the displacement of the cover plate is comparable to a segment of a straight line.

Experience shows that the device of the above air-cushion type and more particularly its guide system, has various disadvantages:

the guide system is relatively complex and heavy, which increases the inertia of the assembly and affects the performance of the pantograph to the extent that an increase in the inertia results in the whole system having a longer response time to disturbances, the length of the rod, which is entailed by the need to have a displacement at its end which is comparable to a segment of a straight line, makes the guide system bulky, the guide system does not prevent a certain buckling of the bellows from occurring, which may introduce a deviation in the displacement of the cover plate when the device returns to a position of equilibrium from which it has temporarily been moved away, and consequently an unjustified deviation in the application pressure of the horned slipper holder;

the guide system is exposed to dusts, aggressive agents and atmospheric precipitations, and requires relatively frequent monitoring and maintenance operations.

The object of the present invention is to propose a novel device for a pantograph enabling the above disadvantages to be reduced very considerably.

SUMMARY OF THE INVENTION

The subject of the present invention is a pantograph for an electric-traction locomotive, comprising a horned slipper holder establishing the electrical contact with an overhead contact wire, and an elastic device of the air-cushion type for pressing the horned slipper holder against the overhead contact wire by way of a torque exerted on a shaft of a lower arm of the pantograph, characterized in that the said elastic device comprises:

a first cover plate integral with the structure of the locomotive, situated facing the first cover plate and connected to the latter by means of a wall made of an elastic material, a second cover plate which can move relative to the first cover plate, the two cover plates forming, together with the said elastic wall, a leaktight enclosure containing a gas, and in particular air, at a pressure which may differ from the atmospheric pressure, arranged inside the leaktight enclosure, a means for guiding the second cover plate which consists of an elongated member whose two ends are each connected in an articulated manner to a cover plate, this means enabling the said second cover plate to be displaced in a substantially translational movement relative to the first cover plate, means for transforming the translational movement of the second cover plate into a rotation of the said shaft of the pantograph.

The use of a pneumatic device according to the invention provides the following advantages:

a) reduction in the inertia of the system as a result of dispensing with the guide member outside the leaktight enclosure and, simultaneously, increase in the compactness of the system, b) production of a translational movement of the second cover plate which is a reproducible movement to the extent that this movement in practice depends only on the pressure of the air in the leaktight enclosure;

c) elimination of maintenance of the guide member of the second cover plate since this member is placed in a leaktight enclosure protected from environmental disturbances, in particular dusts or precipitations, for example, it will be possible for this member to have a lifetime application of grease;

d) furthermore, the preservation over time of the reproducibility of the translational movement of the second cover plate is better ensured owing to the fact that the guide member is protected inside the leaktight enclosure.

It results from the above that a relation may be established with ease between the pressure of the compressed air in the leaktight enclosure and the pressure of the horned slipper holder on the overhead contact wire, assuming that the other parameters are constant such as, for example, the vertical distance of the overhead contact wire relative to the track.

According to a second aspect, the subject of the invention is the combination of a device according to the first aspect of the invention and means enabling the pressure of the compressed air in the leaktight enclosure to be varied with a view to applying the horned slipper holder to the overhead contact wire with a given pressure, and it being possible for the said given pressure itself to be programmed as a function of parameters relating to the environment of the pantograph: vertical distance of the overhead contact wire from the track, speed of the locomotive, etc.

It will be possible for the above-described device to be advantageously associated with a sensor-based system such as that described in the French Patent Application No. 89 05653 of 28 Apr. 1989, this system comprising, in particular, force sensors placed in immediate proximity to the slippers with which the horned slipper holder bears against the overhead contact wire, and the data from the sensors being transmitted by a bundle of optical fibres to an electronic control unit actuating a pneumatic electrovalve.

Other features of the invention will emerge from the description which follows of an exemplary embodiment, given with no limitation being implied and with reference to the attached drawings, in which:

BRIEF DESCRIPTION OF THE DRAWINGS

FIG. 3 is a view in partial cross-section along the plane III—III in FIG. 2.

DESCRIPTION OF THE PREFERRED EMBODIMENT OF THE INVENTION

Figure 1:
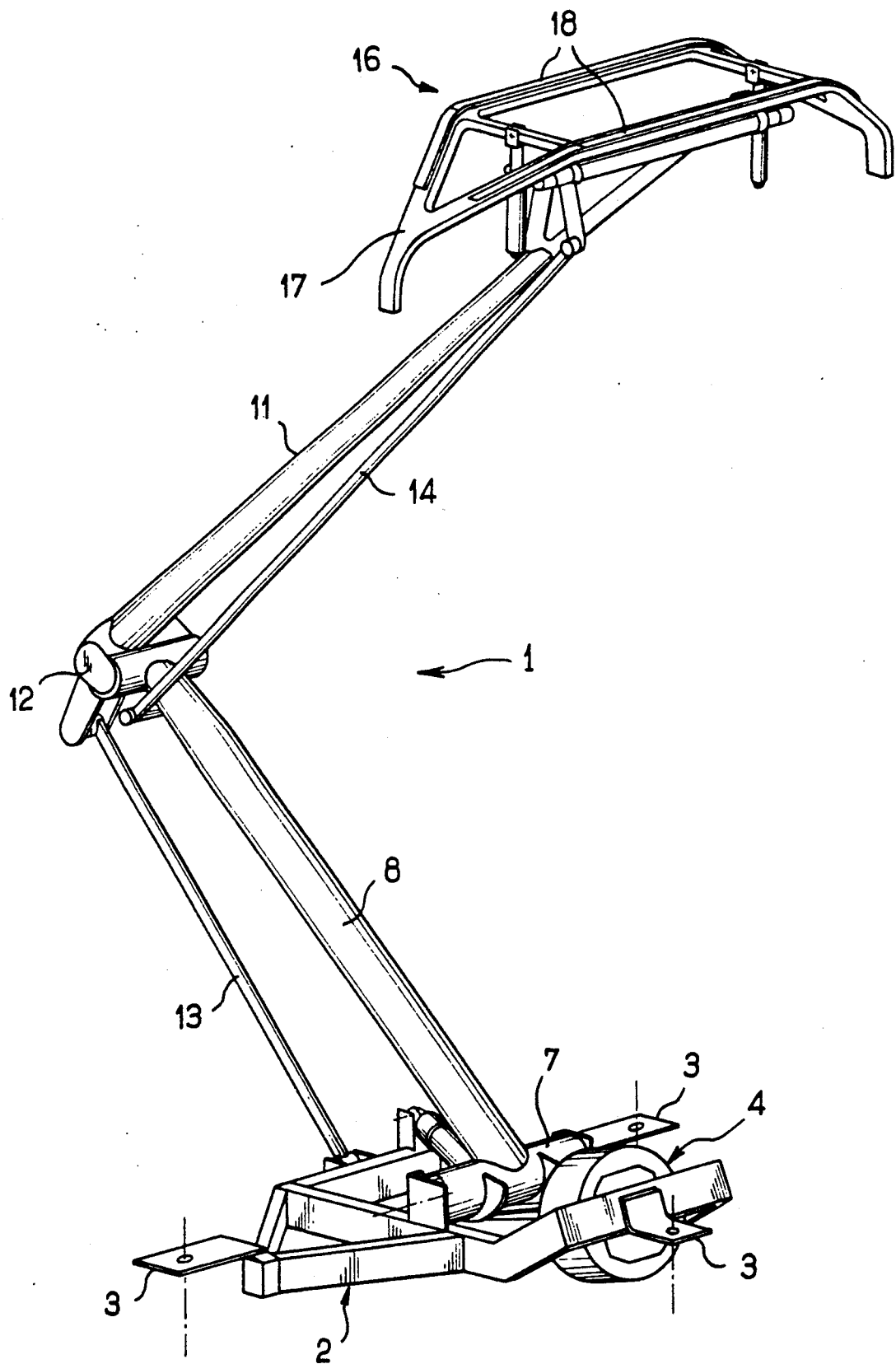
FIG. 1 is a schematic perspective view of a pantograph actuated by means of an actuation system according to the invention.

FIG. 1 shows a pantograph 1 comprising a base structure 2 enabling it to be mounted on the roof of a locomotive, or more generally of a set of railway wagons, which has not been shown. For this purpose, the structure 2 is provided with mounting flanges 3.

An actuating pneumatic cushion 4, acting on a shaft 7 of a lower arm 8 of the tubular structure of the pantograph, is also fastened to the structure 2.

The lower arm 8 is connected to an upper arm 11, also tubular, by a main articulation 12. The pantograph 1 furthermore has a lower and upper parallelogrammatic bar, 13 and 14 respectively.

The arm 11 carries, at its upper end, a horned slipper holder 16 ensuring the contact with an overhead contact wire, not shown. The horned slipper holder 16 has a frame 17 provided with two slippers 18.

Figure 2:
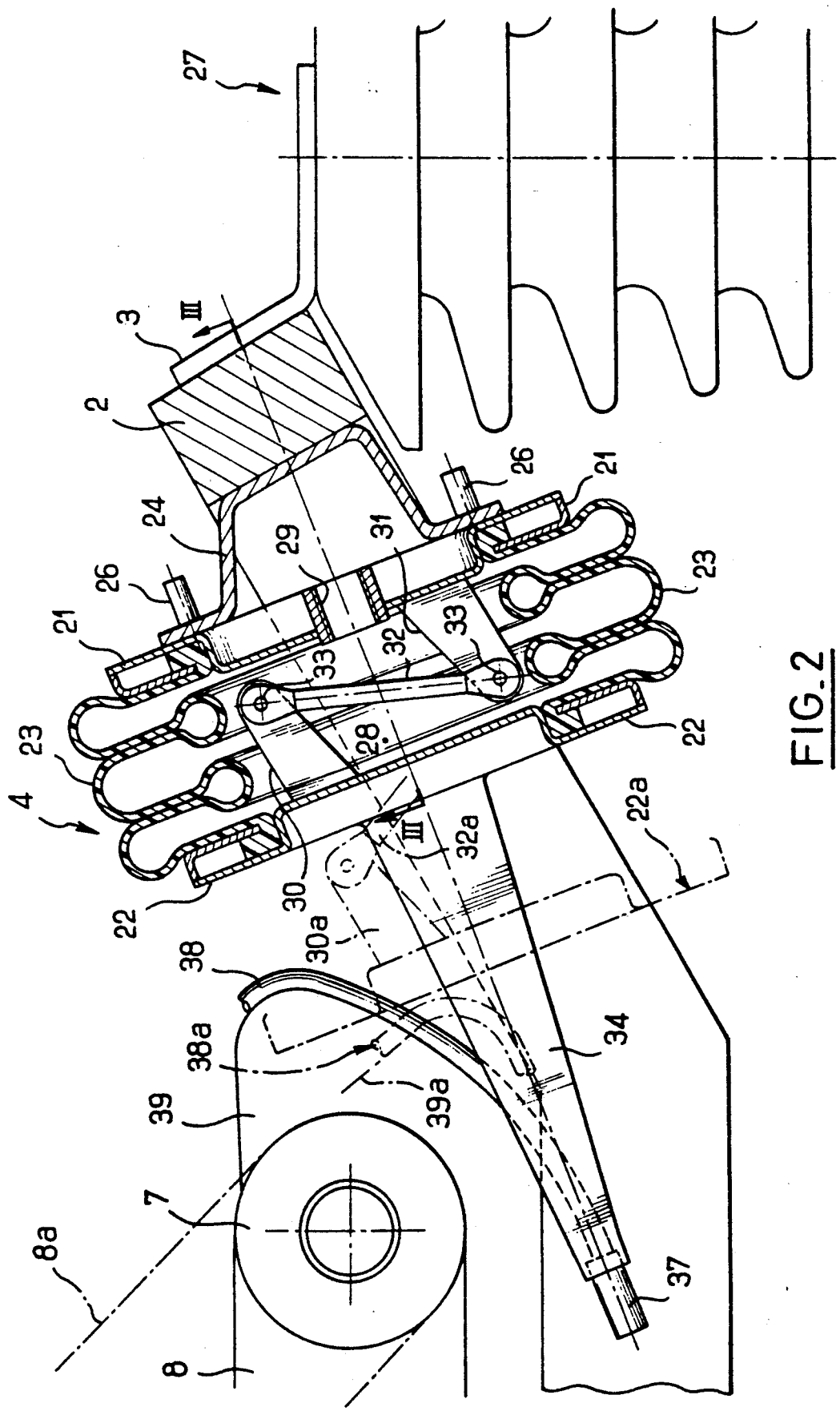
FIG. 2 is a view in enlarged partial cross-section, along a central vertical plane, of the actuation system in FIG. 1.

The actuating pneumatic cushion 4 is shown in more detail in FIGS. 2 and 3. It comprises a first cover plate 21 and a second cover plate 22 with a substantially circular shape which are connected by means of a rubber bellows 23. The bellows 23 has a substantially cylindrical general design such that the two cover plates are substantially coaxial. The cover plate 21 is integral with the roof of the locomotive via, successively, an element 24 of the structure 2, fixed in place by means of bolts 26, and then the flange 3 and an insulator 27.

The cover plates 21, 22, define, together with the bellows 23, a leaktight enclosure 28 which is in communication with a pneumatic supply, not shown, via an opening 29 made in the first cover plate 21. Each cover plate 21, 22 carries, inside the enclosure 28, a lug 30, 31, the two lugs being arranged in the said plane which is perpendicular to the two cover plates and is substantially central relative to each of them, on either side of the axis and at the same distance from the latter. The lugs 30, 31, intended to fasten a connecting rod 32 which can pivot about pins 33, are arranged so as to be symmetrical relative to an axis which is substantially perpendicular to the said central plane and meets the connecting rod (32) substantially at the centre of its elongated part.

An actuating member, having two arms 34 arranged symmetrically relative to an axial vertical plane of the said cover plate and connected by a substantially horizontal crosspiece 36, is fastened to the second cover plate 22. The two ends 37 of two steel-wire ropes 38 passing along two cams 39 integral with the shaft 7 of the lower arm 8 of the pantograph are fastened to the crosspiece 36. Since the ropes 38 are themselves integral in rotation with the shaft 7, the translational movement of the crosspiece 36 is transformed into a rotational movement of the shaft 7 with a corresponding amplitude.

The above device functions as follows.

On the one hand, the mass of the articulated structure of the pantograph 1 must be balanced and, on the other hand, a static load must be applied in order to press the horned slipper holder 16 against the overhead contact wire. In order to do this, an appropriate balancing torque must be applied to the shaft 7 of the lower arm 8. This torque is not constant over the entire development of the pantograph: it is defined by parameters as a function of the angle of the lower arm 8 relative to the horizontal plane. This result is obtained by way of the cam 39/rope 38 system which varies the distance of the point at which the force generated by the pneumatic cushion is applied from the axis of rotation.

The position 22a occupied by the cover plate 22 when the pressure inside the leaktight enclosure 28 is increased to a certain value has been shown in FIG. 2 in dot-dash lines. Corresponding to the position 22a are the position 30a of the lug 30, the position 32a of the connecting rod 32, the position 38a of the rope 38, the position 39a of the cam 39, and lastly the position 8a of the lower arm 8 of the pantograph.

By monitoring the pressure existing in the pneumatic cushion, for example by means of the electronic control unit described in the abovementioned French patent application, it is easy to maintain a pressure for applying the horned slipper holder against the overhead contact wire within a predetermined range.

The guide system according to the invention has numerous advantages when compared with the known systems, and in particular the following:

The connecting rod 32 works virtually solely in traction and in compression, in other words in very favourable conditions for a metal component. This constitutes a significant advantage, in particular from the point of view of longevity, as compared with the guide devices used previously such as the above-described device having an outer rod.

The guide member, being situated inside the leaktight enclosure 28 of the air cushion, is protected from any environmental action (dusts, precipitations, aggressive agents). This enables a substantially constant coefficient of friction to be maintained for the moving components. The guide system according to the invention does not affect the overall height of the actuating system since it is entirely inside the leaktight enclosure, and this constitutes a very favourable feature for a device fixed on a support moving at high speed.

The guide system does not affect the overall length of the actuating system either, since it is possible for it to be housed in the space remaining free in the leaktight enclosure when the latter is in the contracted position (minimum air pressure).

It may be advantageous to define the various settings of the system such that the connecting rod 32 is substantially parallel to the two cover plates 21, 22 for an average functioning position corresponding to the average functioning position of the pantograph. The connecting rod 32 may thus assume, in its range of movement, various positions between two extreme positions which are inclined relative to a central plane parallel to the two cover plates and substantially symmetrical relative to this plane.

This arrangement makes it easier to obtain a translation of the second cover plate 22 in which the latter remains substantially coaxial with the first cover plate 21. Moreover, the accuracy of such a device is virtually independent of the reasonably great distance between the two cover plates.

Lastly, as compared with the known devices having telescopic systems or jacks, the device according to the invention has the advantage of being simpler and lighter, in other words having a smaller inertia.

It may be added that the simultaneous presence of several important features (relatively small inertia, increased accuracy, better reliability) gives the system according to the invention the possibility of a rapid and appropriate response to any irregularity detected in the functioning conditions.

The invention is not, of course, limited to the exemplary embodiment which has just been described and numerous modifications may be made to it without going beyond the scope of this invention.

We claim:

1. A pantograph (1) for an electric-traction locomotive, comprising a horned slipper holder (16) establishing electrical contact with an overhead contact wire, and an elastic device (4) of an air-cushion type for pressing the horned slipper holder (16) against the overhead contact wire by way of a torque exerted on a shaft (7) of a lower arm (8) of the pantograph (1), characterized in that the said elastic device (4) comprises:

a first cover plate (21) integral with the structure of the locomotive, situated facing the first cover plate (21) and connected to the latter by means of a wall (23) made of an elastic material, a second cover plate (22) which can move relative to the first cover plate (21), the first and second cover plates (21, 22) forming, together with the said elastic wall (23), a leaktight enclosure (28) containing a gas at a pressure which may differ from the atmospheric pressure, arranged inside the leaktight enclosure (28), a means for guiding the second cover plate which consists of an elongated member (32) whose two ends are connected in an articulated manner to the first and second cover plates (21,22), respectively, this guiding means enabling the second cover plate (22) to be displaced in a substantially translational movement relative to the first cover plate (21), means for transforming the translational movement of the second cover plate (22) into a rotation of the said shaft (7) of the pantograph.

2. The device according to claim 1, characterized in that the leaktight enclosure (28) is connected to a source of compressed air and in that the device comprises means for adjusting the pressure of the air in the leaktight enclosure (28).

3. The device according to claim 1, characterized in that the guiding means (30, 31, 32) is arranged in a plane substantially central and substantially perpendicular relative to the first and second plates (21,22).

4. The device according to claim 3, characterized in that the guiding means (30, 31, 32) consists of a connecting rod (32) connected at each end to a lug (30, 31) carried by each of the first and second cover plates, the said connecting rod being displaced substantially in the said central plane.

5. The device according to claim 4, characterized in that the assembly of the first and second cover plates (21,22) and the guiding means (30, 31, 32) is substantially symmetrical relative to an axis which is substantially perpendicular to the said central plane and meets the connecting rod (32) at the centre of its elongated member.

6. The device according to claim 1, characterized in that the means for transforming the translational movement of the second cover plate (22) into a rotation of the shaft (7) of the pantograph comprise a cam (39)/rope (38) system enabling a torque to be exerted which may vary as a function of the angle of the lower arm (8) of the pantograph relative to the horizontal plane.

7. The device according to claim 2, characterized in that the means for adjusting the pressure of the air in the leaktight enclosure are associated with means for keeping the pressure of the horned slipper holder (16) against the overhead contact wire within predetermined limits.

* * * * *